US011535810B2

(12) United States Patent
Cormack et al.

(10) Patent No.: US 11,535,810 B2
(45) Date of Patent: Dec. 27, 2022

(54) REMOVING AROMATIC COMPOUNDS FROM A HYDROCARBON FLUID

(71) Applicant: CASTROL LIMITED, Reading (GB)

(72) Inventors: Peter Cormack, Glasgow (GB);
Timothy McCabe, Glasgow (GB);
James Edward Moss, Reading (GB);
Richard Pearson, Reading (GB); John Michael Redshaw, Reading (GB);
Kevin Richard West, Reading (GB)

(73) Assignee: Castrol Limited, Reading (GB)

( * ) Notice: Subject to any disclaimer, the term of this patent is extended or adjusted under 35 U.S.C. 154(b) by 458 days.

(21) Appl. No.: 16/093,629

(22) PCT Filed: Apr. 13, 2017

(86) PCT No.: PCT/EP2017/058949
§ 371 (c)(1),
(2) Date: Oct. 13, 2018

(87) PCT Pub. No.: WO2017/178593
PCT Pub. Date: Oct. 19, 2017

(65) Prior Publication Data
US 2020/0332219 A1  Oct. 22, 2020

(30) Foreign Application Priority Data
Apr. 13, 2016 (GB) .................................... 1606317

(51) Int. Cl.
*C10M 175/00* (2006.01)
*B01J 20/26* (2006.01)
*B01J 20/28* (2006.01)

(52) U.S. Cl.
CPC ...... *C10M 175/0008* (2013.01); *B01J 20/267* (2013.01); *B01J 20/28019* (2013.01);
(Continued)

(58) Field of Classification Search
CPC .............. C10M 175/0008; B01J 20/267; B01J 20/28019; B01J 20/28033; B01J 20/28057;
(Continued)

(56) References Cited

U.S. PATENT DOCUMENTS 4,977,871 A    12/1990   Brownawell et al.
5,042,617 A    8/1991    Brownawell
(Continued)

FOREIGN PATENT DOCUMENTS

EP    0187036 A2    7/1986
EP    1533362 A1    5/2005
(Continued)

OTHER PUBLICATIONS

Clonfero and Schieppati, "Reduction of Polycyclic Aromatic Hydrocarbons from Thermal Clay Recycled Oils Using Technical Adsorbents," Polycyclic Aromatic Compounds 16(1-4):41-50 (2000).
(Continued)

*Primary Examiner* — Prem C Singh
*Assistant Examiner* — Francis C Campanell
(74) *Attorney, Agent, or Firm* — McDonnell Boehnen Hulbert & Berghoff LLP (57) ABSTRACT

A method for removing aromatic compounds from a hydrocarbon fluid comprises contacting the hydrocarbon fluid with a solid-phase polymeric material. The solid-phase polymeric material comprises a cross-linked polymer which contains aromatic groups. The method may be used to prevent the build-up of sludge and soot in a lubricant system in an internal combustion engine. A polymer bead comprising a solid-phase polymeric material is also provided.

20 Claims, 6 Drawing Sheets

(52) U.S. Cl.
CPC ... *B01J 20/28033* (2013.01); *B01J 20/28057* (2013.01); *B01J 20/28069* (2013.01); *B01J 20/28083* (2013.01)

(58) Field of Classification Search
CPC .......... B01J 20/28069; B01J 20/28083; C10G 2400/10; C10G 25/006
USPC ...................................................... 508/111
See application file for complete search history.

(56) References Cited

U.S. PATENT DOCUMENTS

| | | | |
|---|---|---|---|
| 5,225,081 | A | 7/1993 | Brownawell |
| 5,478,463 | A | 12/1995 | Brownawell |
| 5,583,162 | A | 12/1996 | Li et al. |
| 7,097,771 | B2 | 8/2006 | Colucci |
| 7,622,431 | B2 | 11/2009 | Muir |
| 2005/0198894 | A1 | 9/2005 | Rowland |
| 2006/0058413 | A1 | 3/2006 | Leistner |
| 2006/0090393 | A1 | 5/2006 | Rowland et al. |
| 2006/0138052 | A1 | 6/2006 | Leistner |
| 2010/0286414 | A1 | 11/2010 | Bera |
| 2012/0115764 | A1* | 5/2012 | Sabahi ................. C07D 333/18 508/559 |
| 2013/0105396 | A1* | 5/2013 | Falkenhagen ........ B01J 20/3248 210/660 |

FOREIGN PATENT DOCUMENTS

| | | | |
|---|---|---|---|
| EP | 1676615 A1 | 7/2006 | |
| JP | 2015061894 A | 4/2015 | |
| WO | 99/21902 A1 | 5/1999 | |
| WO | 2000/050465 A2 | 8/2000 | |
| WO | 2003/099890 A2 | 12/2003 | |
| WO | 2006/099250 A1 | 9/2006 | |
| WO | 2008/143905 A2 | 11/2008 | |
| WO | WO-2008143905 A2 * | 11/2008 | .............. B01J 39/04 |
| WO | 2011/032163 A1 | 3/2011 | |

OTHER PUBLICATIONS

Seo et al. "Hierarchically Porous Polymers from Hyper-cross-linked Block Polymer Precursors," J. Am. Chem. Soc. 137(2):600-603 (2015).

Bunia et al. "Chemical transformations of different acrylic cross-linked polymers with primary amines and some applications of the synthesized compounds," Reactive and Functional Polymers 66(8):871-883 (2006).

Kuznetsova et al. "Novel stationary phases based on polysterene-divinylbenzene copolymer with hydrophilic spatially-distant functional groups for ion chromatography," Sorbtsionnye i Khromatograficheskie Protsessy 12(6):940-948 (2012); Chemical Abstracts Database accession No. 2013:1137650.

International Search Report and Written Opinion for PCT/EP2017/058949 (dated Oct. 18, 2017).

* cited by examiner

ND AROMATIC COMPOUNDS
REMOVING AROMATIC COMPOUNDS FROM A HYDROCARBON FLUID

This application is a national stage application under 35 U.S.C. § 371 of International Application No. PCT/EP2017/058949, filed Apr. 13, 2017, which claims priority to Great Britain Patent Application No. GB 1606317.4, filed Apr. 13, 2016, the disclosures of which are explicitly incorporated by reference herein.

FIELD OF THE INVENTION

The present invention relates to methods, uses and kits for removing aromatic compounds from a hydrocarbon fluid. In particular, the present invention relates to methods, uses and kits for removing polycyclic aromatic hydrocarbons, such as polynuclear aromatic hydrocarbons, from a hydrocarbon fluid. The methods, uses and kits may be used to prevent the build-up of soot and sludge in the lubricant system of an internal combustion engine.

BACKGROUND OF THE INVENTION

Engine lubricating oils perform many functions. Some of the main functions include wear protection, engine cooling and contaminant dispersion. However, the build-up of both soot and sludge in the oil may hinder the oil in its function of these primary tasks.

Soot is widely believed to be an agglomeration of carbonaceous structures in engine lubricating oils, which may be graphitic in nature. These carbonaceous structures are believed to be polycyclic aromatic hydrocarbons (PAHs), i.e. molecules containing at least 2 aromatic rings which may or may not be fused together to form one, larger aromatic system. The molecule may also contain further functional groups such as alcohols, ketones and carboxylic acids, as well as various nitrogen containing functional groups, such as nitro groups.

PAHs may be formed during combustion processes in internal combustion engines in combustion regions which are locally rich in fuel. The PAHs may transfer into the lubricant via incorporation in blow-by gas travelling past the piston ring and liner region of the engine.

Soot is believed to develop in stages, starting with the nucleation of PAHs and leading to particles having a size of from 20 to 100 nm. These particles will typically contain about 1 million carbon atoms, and have a C:H ratio of from about 8:2 to about 9:1. These soot particles can then either grow from addition of further aromatic samples to a particle, defined as surface growth, or combine with other particles via agglomeration mechanisms. By further agglomeration, networks of soot particles can form which can immobilise sections of oil up to 25 µm across.

The presence of soot in lubricants presents several challenges. Firstly, soot particles can be abrasive, and so undispersed soot may lead to large amounts of abrasive wear within an engine, greatly decreasing engine lifetime. Secondly, soot may thicken the lubricant. This can lead to several problems such as oil starvation via blocking of engine oil filters (which are designed to remove metallic wear particles), or reduction in engine cooling via reduced oil flow. Soot-induced oil thickening can also lead to increased fuel consumption in an engine.

Sludge is defined as a viscous and gelatinous phase in an engine lubricating oil, widely believed to be a water-in-oil emulsion containing oxidised and nitrated partially burnt fuel, along with lubricant degradation products and polar lubricant additives. Several studies have shown the prevalence of water in engine sludge as well as the prevalence of nitrated species. Polycyclic aromatic hydrocarbons (PAHs) are believed to be implicated in the mechanism of sludge formation.

Development of engine sludge can be harmful for an engine for several reasons. Firstly, additives can be sequestered into the water phase, thereby depleting the oil of additives and leading to problems owing to reduced additive concentration and oil-drain interval. This problem may take several forms including increased wear, increased acid build-up and increased oil oxidation. Secondly, sludge can lead to the oil thickening, greatly increasing the fuel consumption of the vehicle. Thirdly, sludge can develop to such an extent that it blocks oil filters, leading to oil starvation throughout the engine, rendering the requirement for immediate engine maintenance. In addition, the prevalence of water in the sludge may lead to increased metal corrosion throughout the engine, decreasing the vehicle lifetime.

To reduce the negative impact of both soot and sludge, dispersants are added to engine lubricating oils. Dispersants are generally based on polyisobutene polyamines or polyisobutene succinic anhydride polyamines. However, the use of dispersants in an engine lubricant may have unwanted consequences. For instance, the dispersants may interact negatively with elastomer materials found in automotive engines. Moreover, the dispersants may greatly increase the viscosity of the engine lubricant, particularly the cold-temperature viscosity. This can impact the fuel efficiency of the engine.

Dispersants do not remove soot particles or sludge from lubricants. Instead, they mitigate many of the problems associated with both soot and sludge by stabilizing soot as smaller, dispersible particles with a reduced tendency to agglomerate. However, dispersants are only able to deal with a finite level of soot or sludge before they are overwhelmed, enabling soot agglomeration and sludge formation to occur on a large scale with concomitant negative impacts. Moreover, the amount of dispersant that can be added to a lubricant is limited because of the unwanted effects that are mentioned above of elastomer incompatibility and lubricant thickening.

There is therefore a need for methods for controlling soot and sludge levels in a lubricating oil which does not rely on a physically active filter media or on the addition of further dispersants.

U.S. Pat. No. 4,977,871 describes a method for removing polynuclear aromatics from used lubricating oils. The method involves the use of a sorbent, preferably activated carbon, to remove the polynuclear aromatics.

U.S. Pat. No. 5,225,081 also describes a method for removing polynuclear aromatics from used lubricating oils. The method involves using a filter system which comprises a thermoplastic binder such as nylon and a chemically active filter media, a physically active filter media, or a mixture thereof. The physically active filter media, as with U.S. Pat. No. 4,977,871, is preferably activated carbon and is disclosed as suitable for removing polynuclear aromatics. The chemically active filter media may comprise strong bases such as magnesium oxide, sodium hydroxide, zinc oxide or mixtures thereof and are disclosed as suitable for removing soot.

Further use of activated carbon to remove polynuclear aromatics from used lubricating oils is disclosed in U.S. Pat. No. 5,042,617.

SUMMARY OF THE INVENTION

It has now been appreciated that particular solid-phase polymers may be used to sequester aromatic compounds, such as polycyclic aromatic hydrocarbons, from a lubricant and other hydrocarbon fluids.

Accordingly, the present invention provides a method for removing aromatic compounds from a hydrocarbon fluid, the method comprising contacting the hydrocarbon fluid with a solid-phase polymeric material, the solid-phase polymeric material comprising a cross-linked polymer containing aromatic groups.

Also provided is a method for preventing the build-up of soot or sludge in a system which comprises a lubricant, said method comprising adding a solid-phase polymeric material to the lubricant, the solid-phase polymeric material comprising a cross-linked polymer containing aromatic groups, and operating the system.

A kit comprising a lubricant composition and a solid-phase polymeric material, the solid-phase polymeric material comprising a cross-linked polymer containing aromatic groups, is also provided.

Uses of a solid-phase polymeric material, the solid-phase polymeric material comprising a cross-linked polymer containing aromatic groups, for removing aromatic compounds from a hydrocarbon fluid and for preventing the build-up of soot or sludge in a system which comprises a lubricant are also provided.

Also provided is a polymer bead comprising a solid-phase polymeric material, the solid-phase polymeric material comprising a cross-linked polymer, the cross-linked polymer comprising aromatic groups, wherein, on contacting a lubricant, the polymer bead removes aromatic compounds from the lubricant.

The invention will now be described by way of illustrative example only, and with reference to the accompanying drawings, in which.

DETAILED DESCRIPTION OF THE INVENTION

Polymer

It has been appreciated that aromatic compounds may be removed from a hydrocarbon fluid using asolid-phase polymeric material comprising a cross-linked polymer containing aromatic groups. Thus, the polymeric material may be used to adsorb aromatic compounds from the liquid phase (for example from a hydrocarbon fluid such as a lubricant) to the solid phase (the polymeric material).

The solid-phase polymeric material is preferably in the form of polymer beads. The polymer beads will generally be spherical in shape, though a variety of shapes may be present such as ovoids. The polymeric material may also be used in other forms including sheets. Since the shape of the polymer bead may vary from an ideal sphere, each bead has an average diameter, that is a value corresponding to the average of the diameter taken at the broadest point of the bead. For an ideal sphere this diameter will be the same regardless of where it is measured. For a non-ideal sphere the maximum diameter may be used as the average diameter instead.

The polymer beads may have a mean average diameter of at least 0.1 µm but less than 1500 µm, of from 10 µm to 1000 µm or of from 100 µm to 500 µm.

The mean average diameter of the polymer beads may be determined using scanning electron microscopy. For instance, the mean average diameter may be determined by sputter coating the polymer beads with gold, generating an image of the particles using scanning electron microscopy, e.g. using a Cambridge Instruments Stereoscan 90, and analysing the image to determine the mean average diameter using image analysis software, e.g. ImageJ.

A cross-linked polymer is a polymer in which chains are joined together to form a three-dimensional network. As a result of being cross-linked, the polymeric material will generally exhibit a degree of porosity, in their dry state and/or when used in a hydrocarbon fluid in which the three-dimensional polymer network may swell. In preferred embodiments, the polymer is porous in its dry state.

Larger pore sizes are believed to be preferred for removing aromatic compounds in the form of larger particles, such as soot, while smaller pore sizes are believed to be preferred for removing molecular aromatic compounds.

The cross-linked polymer may have a specific surface area of from 50 to 3000 $m^2/g$, from 200 to 1500 $m^2/g$, or from 400 to 1500 $m^2/g$.

The specific surface area of the cross-linked polymer may be measured using gas absorption techniques, e.g. according to ISO 9277: 2010. Preferably, the method is conducted using the vacuum technique for degassing (see section 6.1); direct determination of the saturation vapour pressure, $p_o$, using a nitrogen vapour pressure thermometer (see section 6.2); and the static volumetric method for assessing how much gas is adsorbed (see section 6.3, in particular 6.3.1).

The cross-linked polymer may have a mean pore size of from 0.1 to 100 nm, from 1 to 50 nm, or from 2 to 20 nm.

The mean pore size of the cross-linked polymer may be measured using mercury porosimetry and gas adsorption techniques, e.g. according to ISO 15901-2:2006 (for mesopores and macropores). Preferably, the method is conducted using the stepwise static method to obtain pore size data (see section 5.2); the vacuum technique for degassing (see section 8); the static volumetric method, within which the free space is measured with helium before the sample is immersed in liquid nitrogen (see sections 9.3.5, in particular 9.3.5.1; and 9.4.2, in particular 9.4.2.1); at least 20 points for the adsorption and desorption portions of the curve, and preferably 32 points for the adsorption portion and 23 points for the desorption portion (see section 9.3.8); reference isotherms according to the t-plot method for calculating the pore size distribution (see section 14.1); data from the adsorption branch for calculating pore volume and pore size distribution (see section 14.3, in particular 14.3.1); and the BJH method for calculating pore size distribution (see section 14.3.2). Other techniques for measuring the mean pore size of the cross-linked polymer include ISO 15901-3:2006 (for micropores).

It is generally understood in the art that micropores have a size of less than 2 nm in diameter, mesopores have a size of from 2 to 50 nm, and macropores have a size of greater than 50 nm (see e.g. IUPAC Gold Book, version 2.3.3). Therefore the crossed-linked polymers used may have mesopore pore sizes.

The cross-linked polymer may have a pore volume of from 0.01 to 5 $cm^3/g$, from 0.05 to 1 $cm^3/g$, from 0.1 to 0.5 $cm^3/g$.

The pore volume of the cross-linked polymer may be measured using mercury porosimetry and gas adsorption techniques, e.g. according to ISO 15901-2:2006 (for mesopores and macropores, preferably conducted as outlined above) or ISO 15901-3:2006 (for micropores).

In some embodiments, the polymeric material comprises a hyper cross-linked polymer. Hyper cross-linked polymers are obtainable by introducing cross-links into a polymer which is in a swollen state. Hyper cross-linking produces polymers with a high density of pores, and therefore a high specific surface area. For instance, whilst a cross-linked polymer prepared using standard techniques, such as by suspension polymerization, may have a specific surface area of up to about 1000 $m^2/g$, a hyper cross-linked polymer may have a much greater specific surface area, for example of up to 3000 $m^2/g$, or even higher.

The polymeric material may be obtained by a polymerization reaction between a monomer which comprises an aromatic group and a cross-linker.

Aromatic Monomer

Without wishing to be bound by theory, it is believed that the aromatic group helps with attracting and binding aromatic compounds to the polymeric material.

The monomer which comprises an aromatic group is preferably a monomer which comprises a vinyl aromatic group.

In embodiments, the monomer which comprises an aromatic group is selected from a vinyl benzene, vinyl pyridine, vinyl pyrazine, vinyl imidazole, vinyl pyrazole, vinyl oxazole, vinyl thiophene, vinyl naphthalene, vinyl anthracene, vinyl phenanthrene, vinyl tetrazole and a vinyl boron nitride. Preferably, the monomer which comprises an aromatic group is selected from divinyl benzene, vinyl pyridine and vinyl benzyl chloride. For instance, the monomer may be selected from 1,3- or 1,4-divinyl benzene (preferably 1,4-divinyl benzene), 4-vinyl pyridine and 4-vinyl benzyl chloride. Vinyl benzyl chloride is particularly suitable for use in hyper cross-linked polymers.

It will be appreciated that combinations of aromatic monomers may be used to prepare the cross-linked polymer.

The monomer which comprises an aromatic group may have a molar mass of less than 400 g/mol, less than 300 g/mol, or less than 200 g/mol. Generally, the monomer will have a molar mass of greater than 100 g/mol.

Cross-Linker

The cross-linker is believed to be responsible for the formation of pores in the polymeric material.

Suitable cross-linkers are molecules which comprise at least two functional groups which can form bonds between two polymer strands, for example, two non-aromatic vinyl groups. A wide range of cross-linkers may be used. However, for ease of synthesis, it is generally preferred that the cross-linkers are water-insoluble.

Preferably, the cross-linker is selected from the group consisting of divinyl benzene and ethylene glycol-dimethacrylate. For instance, the cross-linker may be selected from 1,3- or 1,4 divinyl benzene (preferably 1,4-divinyl benzene) and ethylene glycol-dimethacrylate. Other suitable cross-linkers include, but are not limited to, trimethylolpropane trimethacrylate (TRIM), pentaerythritol tetra-acrylate (PETRA), and acrylamide based cross-linkers. These cross-linkers are all suitable for use in hyper cross-linked polymeric materials.

Although the cross-linker and aromatic monomer may in some instances be the same (for example they may both be divinyl benzene), it is generally preferred that they are not the same.

The cross-linker may have a molar mass of greater than 70 g/mol and less than 500 g/mol. The molar mass may be between greater than 70 g/mol and less than 400 g/mol, or greater than 70 g/mol and less than 300 g/mol.

Preparation of the Polymer

As mentioned above, the polymeric material may be obtained by a polymerization reaction between a monomer comprising an aromatic group and a cross-linker.

The polymeric material may be obtained using precipitation polymerization, suspension polymerization, or non-aqueous dispersion polymerization. Methods for preparing polymers are well-known to the skilled person.

The characteristics of the cross-linked polymer may be varied by making changes to the methods by which they are produced. For instance, smaller beads (nanoscale beads) are generally formed when emulsion polymerization preparation techniques are adopted. Larger beads (micron to millimeter size beads) are generally formed using suspension polymerization. Even larger beads may be formed using ascension or sedimentation polymerization. Pore size and volume may be varied by changing the solvent system (the nature and amount of solvent) that is used in the polymer synthesis. Precipitation polymerization tends to give polymers with a relatively small (of the order of a few nanometers) pore size.

Cross-linked polymeric materials prepared by precipitation polymerization may be prepared by a method in which solutions of aromatic monomer and cross-linker and initiator are combined. The polymerization reaction gives a milky suspension of polymer particles.

Cross-linked polymeric materials prepared by non-aqueous dispersion polymerization may be prepared by a method in which some of the aromatic monomer is dissolved in solvent in the presence of an initiator. After a period of time, the cross-linker and remaining aromatic monomer are added to the mixture.

Cross-linked polymeric materials prepared by suspension polymerization may be prepared by a method in which a non-aqueous phase containing the aromatic monomer and the cross-linker is added to, and maintained in the form of droplets in, an aqueous phase.

Hyper cross-linked polymeric materials may be prepared by a method in which a cross-linked polymer is formed, swollen, and hyper cross-linked. Thus, a hyper cross-linked polymer may be prepared by a method in which a cross-linked polymeric material (those obtained from any method disclosed above) is left to swell in a solvent. Suitable solvents include 1,2-dichloroethane for a highly swollen polymer and heptane for a less swollen polymer. A catalyst (for example a Friedel-Crafts catalyst such as ferric chloride) may then be added to the swollen polymer particles to produce the hyper cross-linked polymer. Any residual catalyst is preferably removed from the polymeric material by washing with a suitable solvent, with such solvents including but not limited to. polar solvents such as methanol, ethanol, dimethyl ether or diethyl ether. Partial hyper cross-linking may be carried out by using the catalyst in a small amount (less than 1:2 molar ratio of catalyst to reactive groups, such as chloride groups, in the polymer). Alternatively exhaustive hyper cross-linking may be carried out by using the catalyst in a larger amount (at least a 1:1 molar ratio of catalyst to reactive groups, such as chloride groups, in the cross-linked polymer). Partial hyper cross-linking may followed by exhaustive hyper cross-linking.

The polymer may be obtained by a polymerization reaction in which the monomer which comprises an aromatic group and the cross-linker are used in a ratio of from 500:1 to 1:50 by weight. This ration may be from 300:1 to 1:10, or from 200:1 to 1:2 by weight.

The aromatic monomer and the cross-linker may be used in a ratio of from 500:1 to 20:1 by weight, or from 300:1 to 30:1 or from 200:1 to 50:1. These ratios are believed to enable a good degree of swelling during the preparation of a hyper cross-linked polymer. Alternatively, the aromatic monomer and the cross-linker may be used in a ratio of from 10:1 to 1:50, or from 5:1 to 1:10, from 2:1 to 1:2 by weight. These ratios are believed to provide a good degree of porosity in polymeric materials which contain a non-hyper cross-linked polymer.

The aromatic monomer and the cross-linker preferably account for at least 80%, by weight of the monomers used to obtain the polymeric material, sometimes at least 90% and on occasion at least 95% by weight.

Further Functionality

The polymeric material may comprise further functionality, optionally in the form of a functional group grafted thereon.

For example, acid neutralization functionality may be added to the material by grafting a basic functional group thereon. Other functionality that may added to the polymeric material, for example by grafting of suitable functional groups thereon, includes anti-oxidancy.

The basic functional group preferably comprises an amine, such as an acyclic amine, an aromatic amine, or a N-containing heterocycle. Preferred basic functional groups comprise an acyclic amine.

Examples of acyclic amines include primary amines and secondary amines. Primary amines, such as alkyl ammonium carbonates, are generally preferred. Preferred examples of aromatic amines include diphenyldiamine and aniline. Preferred examples of N-containing heterocycles include imidazole, pyridine, pyrazine, pyrazole, oxazole, and piperidine groups.

Grafting of the Functional Groups

The functional groups may be grafted onto the polymer using known methods. For instance, the functional groups may be grafted onto the polymeric material by a substitution reaction with leaving groups, for example, halogens, that are present in the polymer.

Aromatic Compounds

The aromatic compounds preferably have low solubility in the hydrocarbon fluid. The aromatic compounds that are removed using the methods disclosed herein are preferably contaminants, that is components that are undesirable in the hydrocarbon fluid.

The aromatic compounds are preferably polycyclic aromatic hydrocarbons (PAHs), and more preferably polynuclear aromatic hydrocarbons (PNAs), which are polycyclic aromatic hydrocarbons containing fused aromatic rings. The PAHs and PNAs contain two or more aromatic rings, and preferably three or more aromatic rings.

In some embodiments, the methods of removing aromatic compounds from hydrocarbon liquids described above may be used to remove PAHs (and PNAs) in the form of non-aggregated PAHs, such as molecular PAHs, or aggregated PAHs, (say in the form of soot. Non-aggregated PAHs will typically have a size of from 1 to 500 nm. Aggregated PAHs will typically have a size of greater than 500 nm.

The method of the present invention may also be used to remove PAHs in the form of sludge.

Hydrocarbon Fluid

The hydrocarbon fluid may be a lubricant or a fuel, and is preferably a lubricant. In preferred embodiments, the hydrocarbon fluid is for use in an internal combustion engine, e.g. a compression-ignition engine or a spark-ignition engine.

The lubricant may comprise a major amount of oil of lubricating viscosity and a minor amount of at least one lubricant additive. Major amount means greater than 50% and minor amount means less than 50% by weight.

Base Oil

In at least some examples the lubricant comprises base oil. Base oil comprises at least one base stock. The lubricant may comprise base oil in an amount of from greater than 50% to about 99.5% by weight, or from about 85% to about 95% by weight.

The base stocks may be be classified as Group I, II, III, IV and V base stocks according to API standard 1509, "ENGINE OIL LICENSING AND CERTIFICATION SYSTEM", 17$^{th}$ Edition, Annex E (October 2013 with Errata March 2015), as set out in Table 1.

TABLE 1

| Group | Saturated hydrocarbon content (% by weight) ASTM D2007 | | Sulphur content (% by weight) ASTM D2622, D4294, D4927, D3120 or D1552 | | Viscosity Index ASTM D2270 |
|---|---|---|---|---|---|
| I | <90 | and/or | >0.03 | and | ≥80 and <120 |
| II | ≥90 | and | ≤0.03 | and | ≥80 and <120 |
| III | ≥90 | and | ≤0.03 | and | ≥120 |
| IV | Polyalphaolefins | | | | |
| V | all base stocks not in Groups I, II, III or IV | | | | |

Group I, Group II and Group III base stocks may be derived from mineral oils. Group I base stocks are typically manufactured by known processes comprising solvent extraction and solvent dewaxing, or solvent extraction and catalytic dewaxing. Group II and Group III base stocks are typically manufactured by known processes comprising catalytic hydrogenation and/or catalytic hydrocracking, and catalytic hydroisomerisation. Examples of Group I base stocks include AP/E core 150, available from ExxonMobil. Examples of Group II basestocks include EHC 50 and EHC 110, available from ExxonMobil. Examples of Group III base stocks include Yubase 4 and Yubase 6 available for example from SK Lubricants. Examples of Group IV base stocks include hydrogenated oligomers of alpha olefins. Examples of processes for the preparation of the oligomers include free radical processes, Zeigler catalysed processes and cationic Friedel-Crafts catalysed processes. Suitable polyalphaolefin base stocks are derived for example from $C_8$, $C_{10}$, $C_{12}$, $C_{14}$ olefins and mixtures of one or more thereof. Examples of Group V base stocks include ester base stocks, for example Priolube 3970, available from Croda International plc.

Lubricant Additives

The lubricant may also comprise lubricant additives. The lubricant may comprise a single lubricant additive, though it will typically comprise a combination of lubricant additives. The lubricant additives will typically be present in the lubricant in an amount of from about 5% to about 40% by weight, or about 10% to about 30% by weight.

Suitable lubricant additives include detergents (including metallic and non-metallic detergents), friction modifiers, dispersants (including metallic and non-metallic dispersants), viscosity modifiers, dispersant viscosity modifiers, viscosity index improvers, pour point depressants, anti-wear additives, rust inhibitors, corrosion inhibitors, antioxidants (sometimes also called oxidation inhibitors), anti-foams (sometimes also called anti-foaming agents), seal swell agents (sometimes also called seal compatibility agents), extreme pressure additives (including metallic, non-metallic, phosphorus containing, non-phosphorus containing, sulphur containing and non-sulphur containing extreme pressure additives), surfactants, demulsifiers, anti-seizure agents, wax modifiers, lubricity agents, anti-staining agents, chromophoric agents, metal deactivators, and mixtures of two or more thereof.

In some embodiments, the lubricant comprises a detergent. Examples of detergents include ashless detergents (non-metal containing detergents) and metal-containing detergents. Suitable non-metal containing detergents are described for example in U.S. Pat. No. 7,622,431. Metal-containing detergents comprise at least one metal salt of at least one organic acid, which is called soap or surfactant. Suitable organic acids include for example, sulphonic acids, phenols (suitably sulphurised and including for example, phenols with more than one hydroxyl group, phenols with fused aromatic rings, phenols which have been modified (for example, alkylene bridged phenols, and Mannich base-condensed phenols and saligenin-type phenols, produced for example by reaction of phenol and an aldehyde under basic conditions)) and sulphurised derivatives thereof, and carboxylic acids including for example, aromatic carboxylic acids (for example hydrocarbyl-substituted salicylic acids and derivatives thereof, for example hydrocarbyl substituted salicylic acids and sulphurised derivatives thereof).

In some embodiments, the lubricant comprises a friction modifier. Suitable friction modifiers include for example, ash-producing additives and ashless (non-metal containing) additives. Examples of suitable friction modifiers include fatty acid derivatives including for example, fatty acid esters, amides, amines, and ethoxylated amines. Examples of suitable ester friction modifiers include esters of glycerol for example, mono-, di-, and tri-oleates, mono-palmitates and mono-myristates. A particularly suitable fatty acid ester friction modifier is glycerol monooleate. Examples of suitable friction modifiers also include molybdenum compounds for example, organo molybdenum compounds, molybdenum dialkyldithiocarbamates, molybdenum dialkylthiophosphates, molybdenum disulphide, tri-molybdenum cluster dialkyldithiocarbamates, non-sulphur molybdenum compounds and the like. Suitable molybdenum-containing compounds are described for example, in EP 1533362 A1 for example in paragraphs [0101] to [0117].

In some embodiments, the lubricant comprises a dispersant. Examples of suitable ashless (non-metal containing) dispersants include oil soluble salts, esters, amino-esters, amides, imides and oxazolines of long chain hydrocarbon-substituted mono- and polycarboxylic acids or anhydrides thereof; thiocarboxylate derivatives of long chain hydrocarbons; long chain aliphatic hydrocarbons containing polyamine moieties attached directly thereto; Mannich condensation products formed by condensing a long chain substituted phenol with formaldehyde and polyalkylene polyamine; Koch reaction products and the like.

In some embodiments, the lubricant comprises a dispersant viscosity modifier. Examples of suitable dispersant viscosity modifiers and methods of making them are described in WO 99/21902, WO 2003/099890 and WO 2006/099250.

In some embodiments, the lubricant comprises a viscosity index improver. Examples of suitable viscosity modifiers include high molecular weight hydrocarbon polymers (for example polyisobutylene, copolymers of ethylene and propylene and higher alpha-olefins); polyesters (for example polymethacrylates); hydrogenated poly(styrene-co-butadiene or isoprene) polymers and modifications (for example star polymers); and esterified poly(styrene-co-maleic anhydride) polymers. Oil-soluble viscosity modifying polymers generally exhibit number average molecular weights of at least about 15000 to about 1000000, such as about 20000 to about 600000 as determined by gel permeation chromatography or light scattering methods.

In some embodiments, the lubricant comprises a pour point depressant. Examples of suitable pour point depressants include $C_8$ to $C_{18}$ dialkyl fumarate/vinyl acetate copolymers, methacrylates, polyacrylates, polyarylamides, polymethacrylates, polyalkyl methacrylates, vinyl fumarates, styrene esters, condensation products of haloparaffin waxes and aromatic compounds, vinyl carboxylate polymers, terpolymers of dialkyfumarates, vinyl esters of fatty acids and allyl vinyl ethers, wax naphthalene and the like.

In at least some examples, the lubricant additive includes at least one anti-wear additive. Examples of suitable anti-wear additives include non-phosphorus containing additives for example, sulphurised olefins. Examples of suitable anti-wear additives also include phosphorus-containing anti-wear additives. Examples of suitable ashless (non-metal containing) phosphorus-containing anti-wear additives include trilauryl phosphite and triphenylphosphorothionate and those disclosed in paragraph [0036] of US 2005/0198894. Examples of suitable ash-forming, phosphorus-containing anti-wear additives include dihydrocarbyl dithiophosphate metal salts. Examples of suitable metals of the dihydrocarbyl dithiophosphate metal salts include alkali and alkaline earth metals, aluminium, lead, tin, molybdenum, manganese, nickel, copper and zinc. Particularly suitable dihydrocarbyl dithiophosphate metal salts are zinc dihydrocarbyl dithiophosphates (ZDDP).

In some embodiments, the lubricant comprises a rust inhibitor. Examples of suitable rust inhibitors include non-ionic polyoxyalkylene polyols and esters thereof, polyoxyalkylene phenols, polyoxyalkylene polyols, anionic alky sulphonic acids, zinc dithiophosphates, metal phenolates, basic metal sulphonates, fatty acids and amines.

In some embodiments, the lubricant comprises a corrosion inhibitor. Examples of suitable corrosion inhibitors include phosphosulphurised hydrocarbons and the products obtained by the reaction of phosphosulphurised hydrocarbon with an alkaline earth metal oxide or hydroxide, non-ionic polyoxyalkylene polyols and esters thereof, polyoxyalkylene phenols, thiadiazoles, triazoles and anionic alkyl sulphonic acids. Examples of suitable epoxidised ester corrosion inhibitors are described in US 2006/0090393.

In some embodiments, the lubricant comprises an antioxidant. Examples of suitable antioxidants include alkylated diphenylamines, N-alkylated phenylenediamines, phenyl-a-naphthylamine, alkylated phenyl-a-naphthylamines, dimethylquinolines, trimethyldihydroquinolines and oligomeric compositions derived therefrom, hindered phenolics (including ashless (metal-free) phenolic compounds and neutral and basic metal salts of certain phenolic compounds), aromatic amines (including alkylated and non-alkylated aromatic amines), sulphurised alkyl phenols and alkali and alkaline earth metal salts thereof, alkylated hydroquinones, hydroxylated thiodiphenyl ethers, alkylidenebisphenols, thiopropionates, metallic dithiocarbamates, 1,3,4-dimercaptothiadiazole and derivatives, oil soluble copper compounds (for example, copper dihydrocarbyl thio- or thio-phosphate, copper salts of a synthetic or natural carboxylic acids, for example a $C_8$ to $C_{18}$ fatty acid, an unsaturated acid or a branched carboxylic acid, for example basic, neutral or acidic Cu(I) and/or Cu(II) salts derived from alkenyl succinic acids or anhydrides), alkaline earth metal salts of alkylphenolthioesters, suitably containing $C_5$ to $C_{12}$ alkyl side chains, calcium nonylphenol sulphide, barium t-octylphenyl sulphide, dioctylphenylamine, phosphosulphurised or sulphurised hydrocarbons, oil soluble phenates, oil soluble sulphurised phenates, calcium dodecylphenol sulphide, phosphosulphurised hydrocarbons, sulphurised hydrocarbons, phosphorus esters, low sulphur peroxide decomposers and the like.

In some embodiments, the lubricant comprises an antifoam agent. Examples of suitable anti-foam agents include silicones, organic polymers, siloxanes (including poly siloxanes and (poly) dimethyl siloxanes, phenyl methyl siloxanes), acrylates and the like.

In some embodiments, the lubricant comprises a seal swell agent. Examples of suitable seal swell agents include long chain organic acids, organic phosphates, aromatic esters, aromatic hydrocarbons, esters (for example butylbenzyl phthalate) and polybutenyl succinic anhydride.

The lubricant may comprise lubricant additives in the amounts shown in Table 2.

TABLE 2

| Additive type | Lubricant | |
|---|---|---|
| | Suitable amount (actives) if present by weight | Preferred amount (actives) if present by weight |
| Phosphorus-containing anti-wear additives | Corresponding to about 10 to about 6000 ppm P | Corresponding to about 10 to about 1000 ppm P |
| Molybdenum-containing anti-wear additives | Corresponding to about 10 to about 1000 ppm Mo | Corresponding to about 40 to about 600 ppm Mo |
| Boron-containing anti-wear additives | Corresponding to about 10 to about 500 ppm B | Corresponding to about 50 to about 100 ppm B |
| Friction modifiers | About 0.01 to about 5% | About 0.01 to about 1.5% |
| Molybdenum-containing additives | Corresponding to about 10 to about 1000 ppm Mo | Corresponding to about 50 to about 600 ppm Mo |
| Dispersants | About 0.1 to about 20% | About 0.1 to about 8% |
| Detergents | About 0.01 to about 6% | About 0.01 to about 4% |

TABLE 2-continued

| Additive type | Lubricant | |
|---|---|---|
| | Suitable amount (actives) if present by weight | Preferred amount (actives) if present by weight |
| Viscosity index improvers | About 0.01 to about 20% | About 0.01 to about 15% |
| Pour point depressants | About 0.01 to about 5% | About 0.01 to about 1.5% |
| Corrosion and/or rust inhibitors | About 0.01 to about 5% | About 0.01 to about 1.5% |
| Anti-oxidants | About 0.01 to about 10% | About 0.5 to about 5% |
| Antifoams containing silicon | Corresponding to about 1 to about 20 ppm Si | Corresponding to about 1 to about 10 ppm Si |

An advantage of the solid-phase polymeric materials, when used in the lubricant system, is that they provide the functionality typically imparted by other lubricant additives such as the dispersant additives. Thus, in some embodiments, by using the polymer polymeric material, the amount of additives in the lubricant composition, e.g. the amount of dispersant, may be reduced as compared to typical lubricant compositions without compromising performance. Moreover, unlike dispersant additives, the polymeric material is not believed to increase the viscosity of the lubricant or lead to problems with the seals that are present in the lubricant system.

The use of the solid-phase polymeric material in the lubricant system may also mean that the content of metal-containing additives in the lubricant may be reduced. In embodiments, the lubricant is free from zinc dihydrocarbyl dithiophosphates. In other embodiments, the lubricant may even contain substantially only nitrogen, carbon, oxygen and hydrogen. The use of the solid-phase polymeric material may also mean that the filtration system can be modified.

System in which Hydrocarbon Fluid is Used

The solid-phase polymeric material is preferably used in a lubricant which forms part of a lubricant system in an internal combustion engine. Once aromatic compounds are sequestered from the lubricant, they are unable to cause either oil thickening or abrasive wear for example. Moreover, the use of the solid-phase polymeric material may enable a lower concentration of dispersant additives to be used in the lubricant as well as easier re-refining of used lubricants.

In some embodiments, the lubricant may be removed from the lubricant system, cleaned using the solid-phase polymeric material, and reintroduced into the lubricant system.

However, it is preferable for the solid-phase polymeric material to be introduced into the lubricant system in a format that maximises the available surface-area, for example, in the form of beads. The solid-phase polymeric material may be used in any area of a lubricant system, though it is highly preferred that it does not compromise the circulation of the lubricant. The solid-phase polymeric material is preferably held within the lubricant system so that it does not exit the lubricant system e.g. into a combustion chamber. Suitable locations for the solid-phase polymeric material to be held include at the bottom of an engine sump, in a sump plug, in an oil cooler or behind a filter. The solid-phase polymeric material may also be incorporated into a filter. The solid-phase polymeric material may also be held in a chamber outside the engine which is connected to the lubricant system.

Preferably, the solid-phase polymeric material in the form of polymer beads is used in a fluidised bed over which the lubricant can freely flow. For instance, the solid-phase polymeric material may be contained in a sack which serves to prevent its movement around the engine but is permeable to the lubricant. The solid-phase polymeric material may also be moulded into a composite or immobilised in a matrix, e.g. a porous matrix which comprises the solid-phase polymeric material.

The solid-phase polymeric material may be periodically replaced with unused material, or with rejuvenated material (such as material which has been refreshed so that it is able to remove further aromatic compounds).

Removal of Aromatics

The present invention provides methods in which aromatic compounds are removed from a hydrocarbon fluid. The invention also provides the use of solid-phase polymeric materials for removing aromatic compounds from a hydrocarbon.

The solid-phase polymeric material may be used in an amount of at least 1 g, and preferably more than 1 g, per litre of hydrocarbon fluid.

In some embodiments, the solid-phase polymeric material is used to remove aromatic compounds as they become present in the hydrocarbon fluid, in other words as they transfer from the combustion chamber into the lubricant system. These embodiments represent 'keep-clean' uses of the solid-phase polymeric material. In other embodiments, the solid-phase polymeric material is used to remove aromatic compounds from a fluid in which the aromatic compounds have already built-up. These embodiments represent 'clean-up' uses of the solid-phase polymeric material.

Since the solid-phase polymeric material may be used to remove PAHs in the form of soot precursors and/or primary soot particles from a hydrocarbon fluid, then the present invention also provides a method for preventing the build-up of soot and/or sludge in a lubricant, as well as the use of the solid-phase polymeric material for preventing the build-up of soot and/or sludge. A kit which comprises a lubricant composition and the solid-phase polymeric material may be supplied for use in these embodiments.

The ability of the solid-phase polymeric material to remove aromatic compounds from a hydrocarbon fluid may be tested using laboratory methods. The method may comprise immersing the solid-phase polymeric material (for example by immersing 25 g of polymer beads) in hydrocarbon fluid (such as heptane, in an amount of, for example, 500 µL) which contains aromatic compounds (for example each of acenapthene, anthracene, pyrene, 1-nitropyrene and 2-methylnapthalene, in an amount of 30 µg/ml]) for 24 hours at ambient temperature. The used solid-phase polymeric material (polymer beads) may be removed from solution by filtration.

The proportion of aromatic compounds removed from the hydrocarbon fluid may be determined by comparing the content of aromatic compounds in the hydrocarbon fluid before and after the test, for example using thermogravimetric analysis (TGA). Preferably, the thermogravimetric analysis is carried out according to the method disclosed in Annex A4 of ASTM D5967-15a.

The invention will now be described with reference to the following non-limiting examples.

EXAMPLES

Example 1: Preparation of Solid-Phase Polymeric Materials

Preparation of P2, Lightly Cross-Linked poly(styrene-co-VBC-co-EGDMA)

To a 150 mL, 3-necked flask, fitted with an overhead stirrer (2-bladed Teflon™ stirrer), condenser and gas inlet, was added stabiliser (PVP 360, 1 g), co-stabiliser (Triton X-405, 0.35 g), all of the monomer styrene (5.025 g, 48.3 mmol), half of the functional co-monomer VBC (2.51 g, 13.2 mmol), half of the total solvent ethanol (18.75 g, 23.8 mL) and all of the initiator AIBN (2 wt % relative to total monomer mass, 0.201 g, 1.9 mmol). The contents of the flask were stirred at 100 rpm and once homogeneous the resultant solution was degassed under $N_2$ by bubbling nitrogen through the solution for 30 minutes (thereafter the reaction was carried out under a blanket of nitrogen). The reaction was then heated to 70° C. for 1 hour. A solution of the cross-linker EGDMA (1 wt % relative to total monomer mass, 0.10 g, 0.5 mmol) dissolved in the remaining functional co-monomer VBC (2.51 g, 13.2 mmol) and the remaining solvent ethanol (18.75 g, 23.8 mL), heated to 70° C., was then added. Thereafter, the polymerisation was allowed to proceed for a further 23 hours. The resultant particles were centrifuged at 9,000 rpm for 10 minutes. The liquid supernatant was then removed and the particles were resuspended in ethanol and centrifuged again. This process was repeated once more in ethanol and a further twice in methanol. The particles were finally filtered by vacuum on a 0.45 µm nylon membrane filter before being dried overnight to constant mass in a vacuum oven (60 mbar, 40° C.).

Yield: 7.1 g, 72%

Preparation of P11, Hyper Cross-Linked poly(styrene-co-VBC-co-EGDMA)

To a 150 mL, 3-necked flask, fitted with an overhead stirrer, condenser and gas inlet, was added precursor polymer particles poly(styrene-co-VBC-co-EGDMA), TM11 (2 g) and 1,2-dichloroethane (60 mL). The particles were left to swell for 1 hour at room temperature while the system was purged with $N_2$. Ferric chloride (1.03 g, 6.4 mmol) (1:1 mole ratio with respect to pendent chloromethyl groups present in the precursor particles; the precursor particles had an expected chlorine content of 11.3%) dissolved in 1,2-dichloroethane (60 mL) was added to the swollen polymer particles and the reaction heated to 80° C. for 18 hours. The product was filtered by vacuum on a 0.45 µm nylon membrane filter and washed with methanol and aqueous $HNO_3$ (2 M). The particles were then extracted overnight with acetone in a Soxhlet extractor. The particles were once again filtered on a 0.45 µm nylon membrane and washed with methanol and diethyl ether before drying in a vacuum oven (60 mbar, 40° C.) to constant mass.

Yield: 1.6 g, 89%

Preparation of P5, Lightly Cross-Linked poly(VBC-co-4-VP-co-EGDMA)

To a 150 mL, 3-necked flask, fitted with an overhead stirrer (2-bladed Teflon™ stirrer), condenser and gas inlet, was added stabiliser (PVP 360, 1 g), co-stabiliser (Triton X-405, 0.35 g), all of the monomer VBC (9.36 g, 61.3 mmol), half of the functional co-monomer 4-vinylpyridine (0.32 g, 3 mmol), half of the total solvent ethanol (18.75 g, 23.8 mL) and all of the initiator, AIBN (2 wt % relative to total monomer mass, 0.2 g, 1.9 mmol). The contents of the flask were stirred at 100 rpm and once homogeneous the resultant solution was degassed under $N_2$ by bubbling nitrogen through the solution for 30 minutes (thereafter the reaction was carried out under a blanket of nitrogen). The reaction was then heated to 70° C. for 1 hour. A solution of the cross-linker, EGDMA (1 wt % relative to total monomer mass, 0.1 g, 0.5 mmol) dissolved in the remaining functional co-monomer, 4-vinylpyridine (0.32 g, 3 mmol) and the remaining solvent, ethanol (18.75 g, 23.8 mL), heated to 70° C., was then added. Thereafter, the polymerisation was allowed to proceed for a further 23 hours. The resultant particles were centrifuged at 9,000 rpm for 10 minutes. The liquid supernatant was then removed and the particles were resuspended in ethanol and centrifuged again. This process was repeated once more in ethanol and a further twice in methanol. The particles were finally filtered by vacuum on a 0.22 µm nylon membrane filter before being dried overnight to constant mass in a vacuum oven (60 mbar, 40° C.).

Yield: 8.2 g, 82%

Preparation of P13, Hyper Cross-Linked poly(VBC-co-4-VP-co-EGDMA)

To a 150 mL, 3-necked flask, fitted with an overhead stirrer, condenser and gas inlet, was added precursor polymer particles Poly(VBC-co-4-VP-co-EGDMA), TM19 (1.5 g) and 1,2-dichloroethane (40 mL). The particles were left to swell for 1 hour at room temperature while the system was purged with $N_2$. Ferric chloride (1.45 g, 9 mmol) (1:1 mole ratio with respect to pendent chloromethyl groups present in the precursor particles; the precursor particles had an expected chlorine content of 21.2%) dissolved in 1,2-dichloroethane (40 mL) was added to the swollen polymer particles and the reaction heated to 80° C. for 18 hours. The product was filtered by vacuum on a 0.45 µm nylon membrane filter and washed with methanol and aqueous $HNO_3$ (2 M). The particles were then extracted overnight with acetone in a Soxhlet extractor. The particles were once again filtered on a 0.45 µm nylon membrane and washed with methanol and diethyl ether before drying in a vacuum oven (60 mbar, 40° C.) to constant mass.

Yield: 1.2 g, 96%

Example 2: Use of the Solid-Phase Polymeric Materials to Remove Aromatic Compounds 25 mg of polymer beads were added to a 500 µL solution containing 30 µg/ml of different PAHs (acenapthene, anthracene, pyrene, 1-nitropyrene and 2-methylnapthalene) in heptane. The samples were incubated for 24 hours at room temperature. The polymer beads were removed from solution by filtration. The concentration of PAHs remaining in the solution was measured. The percentage of PAHs removed is summarized in the table below:

TABLE 3

| | | | % PAHs removed from solution | | | | |
|---|---|---|---|---|---|---|---|
| | | Polymer | Acenapthene | Anthracene | Pyrene | 1-nitropyrene | 2-methyl naphthalene |
| Control | | None | 0 | 0 | 0 | 0 | 0 |
| Lightly cross-linked polymers | P1 | Poly(styrene-co-EGDMA) | 6 | 5 | 15 | 37 | 7 |
| | P2 | Poly(styrene-co-VBC-co-EGDMA) | 7 | 5 | 21 | 50 | 0 |
| | P3 | Poly(styrene-co-4-VP-co-EGDMA) | 8 | 3 | 20 | 43 | 3 |
| | P4 | Poly(DVB-80-co-4-VP) | 3 | 11 | 5 | 13 | 7 |
| | P5 | Poly(VBC-co-4-VP-co-EGDMA) | 10 | 30 | 40 | 80 | 3 |
| Heavily cross-linked polymers | P6 | Poly(DVB-80) | 17 | 16 | 34 | 70 | 13 |
| | P7 | Poly(DVB-80-co-4-VP)[2] | 22 | 26 | 40 | 73 | 20 |
| | P8 | Poly(DVB-80-co-4-VP)[2] | 21 | 27 | 43 | 73 | 20 |
| | P9 | Poly(DVB-80-co-4-VP)[2] | 22 | 27 | 43 | 73 | 10 |
| Hyper cross-linked polymers | P10 | Poly(DVB-80-co-VBC) | 30 | 39 | 58 | 77 | 23 |
| | P11 | Poly(styrene-co-VBC-co-EGDMA) | 21 | 19 | 43 | 73 | 17 |
| | P12 | Poly(styrene-co-VBC-co-EGDMA)[1] | 20 | 23 | 40 | 70 | 17 |
| | P13 | Poly(VBC-co-4-VP-co-EGDMA) | 49 | 74 | 87 | 100 | 40 |
| | P14 | Poly(VBC-co-4-VP-co-EGDMA)[1] | 52 | 68 | 86 | 97 | 43 |

[1]Produced by partial hyper cross-linking, followed by exhaustive hyper cross-linking
[2]Different radical initiators used to prepare the polymers It can be seen that the polymeric materials disclosed herein may be used to remove PAHs from heptane. Particularly effective results were obtained using the more porous polymers (both non-hyper cross-linked and hyper cross-linked).

In order to determine the efficacy of the method in a quantitative manner and the mechanism by which the polymeric materials were able to sequester aromatic compounds from hydrocarbon fluids, engine testing, TEM (Transmission Electron Microscopy) and SEM (Scanning Electron Microscopy) analyses were undertaken in conjunction with the TGA analysis described above.

Example 3. Fired Engine Testing

A 0.5 litre single-cylinder diesel engine was used to conduct a fired engine test. The engine was provided with two parallel oil filters to enable the addition of the polymer beads. The two oil filters were in parallel to allow easy switching from one to the other, with the standard filter in Circuit 1 and the filter loaded with polymer beads in Circuit 2. Both oil filters were connected to the engine via a series of valves, such that lubricant flowed from the filters to a cooler before entering the engine and being pumped back through the filters by an oil pump in a continuous loop.

To carry out the test a candidate lubricant was pre-loaded with 2.5 g polymer beads on the spring side of the oil filter in Circuit 2 such that lubricant exiting the engine would pass over the beads before flowing through the filter. This was to enable sufficient contact of the polymer beads with the lubricant without the polymer beads entering the engine itself. Two different compositions of polymer beads were used:

| Polymer Bead Sample | Composition |
| --- | --- |
| A | Divinyl bezene 80 wt %, 4-vinyl pyridine 20 wt % |
| B | Styrene 49.5 wt %, vinyl benzyl chloride 49.5 wt %, ethylene glycol dimethacrylate 1 wt % |

Once loaded into Circuit 2, a first 100 ml sample of lubricant was removed for analysis. After this, the engine heater and the oil pump started the engine start up sequence. The engine was then held at a steady-state condition for one hour before stopping to refuel, at which point a 100 ml sample of lubricant was removed from circuit 2 for analysis, and the engine restarted and operated in the steady-state condition. This process was repeated for 8 hours, after which a final 100 ml of lubricant was removed for analysis. The steady-state engine point calibration was:

Naturally aspirated air intake pressure;
1800 bar injection pressure;
Single injection;
10.5° C. BTDC (before top dead centre) start of main injection;
0.5 ms main injection duration.

This created an over-fueled, high in-cylinder pressure peak combustion even just past TDC to push as much soot from combustion due to the over fuelling past the piston rings and into the lubricant. The exhaust smoke reading did not exceed 20% for the duration of the test. In each test the coolant temperature were maintained at 55° C.

Five test runs were carried out: two reference lubricants and three containing polymer beads as shown in the table below. Each sample was analysed using TGA in accordance with ASTM D5967 as described above.

| Test Number | Sample | Chart Symbol (FIG. 1) |
| --- | --- | --- |
| 1 | Reference example 1 | ♦ |
| 2 | Sample 1 Polymer A | ■ |
| 3 | Sample 2 Polymer A (double test time) | ▲ |
| 4 | Reference example 2[3] | ✶ |
| 5 | Sample 3 Polymer B | ● |

[3]base fuel change

Figure 1:
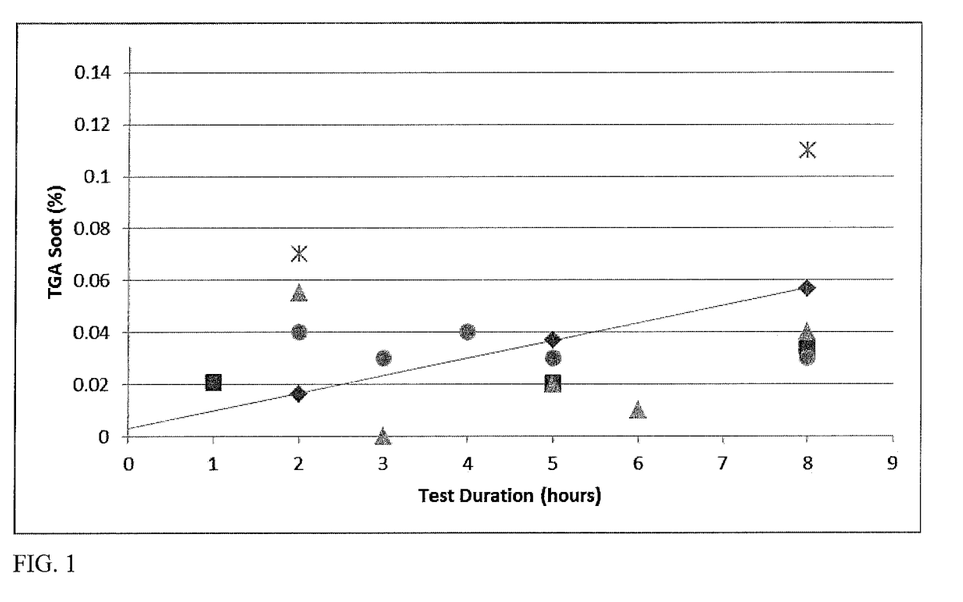
FIG. 1 is a plot showing percentage soot obtained by TGA against time for a number of reference lubricant compositions and lubricant compositions employing polymer beads.

FIG. 1 is a plot showing percentage soot obtained by TGA against time for a number of reference lubricant compositions and lubricant compositions employing polymer beads. Using a linear fit on the data for reference sample 1 allows the effect of the polymer beads to be examined. Initially the amount of soot in the lubricant for the samples containing polymer beads is between the two reference examples. Over time the amount of soot in each reference sample increases whereas that in each sample containing polymer beads either decreases or remains approximately constant.

Figure 2A:
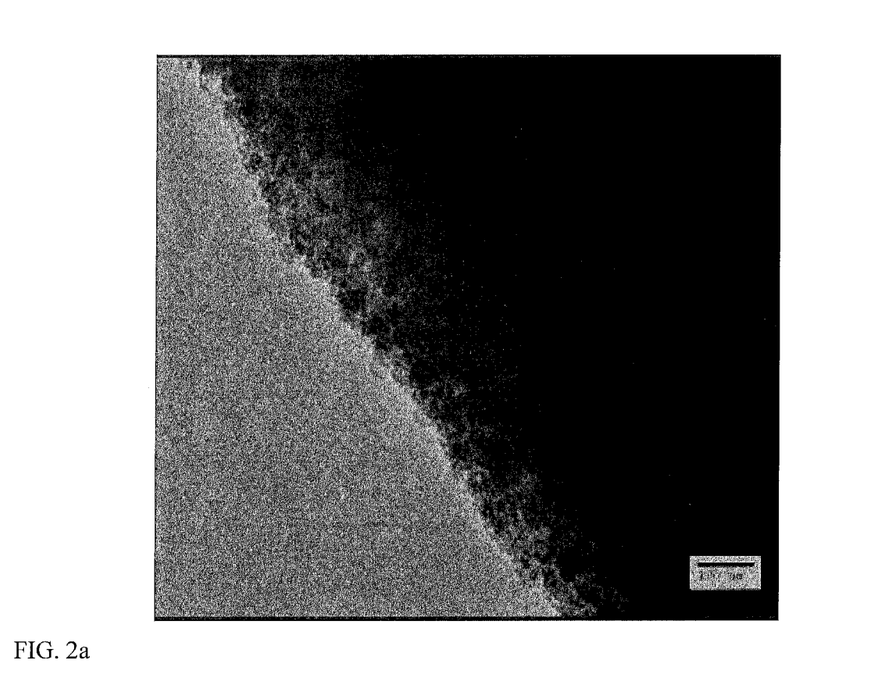
FIG. 2a is a transmission electron microscope (TEM) micrograph showing the surface of a polymer bead of composition A before exposure to soot in a lubricant system.
Figure 2B:
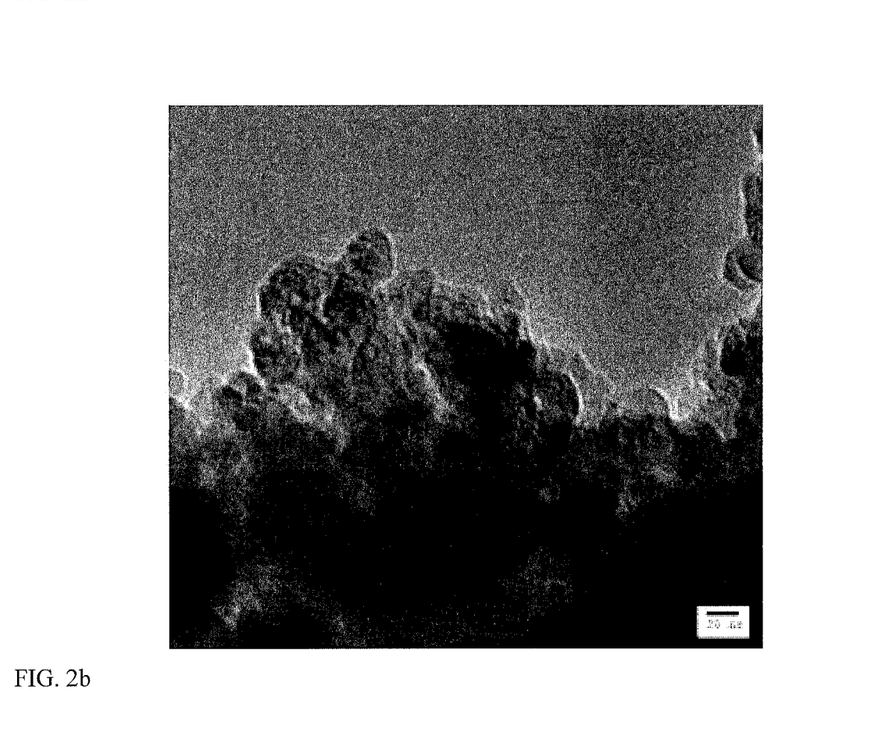
FIG. 2b is a transmission electron microscope (TEM) micrograph showing the surface of a polymer bead of composition A after exposure to soot in a lubricant system.
Figure 3A:
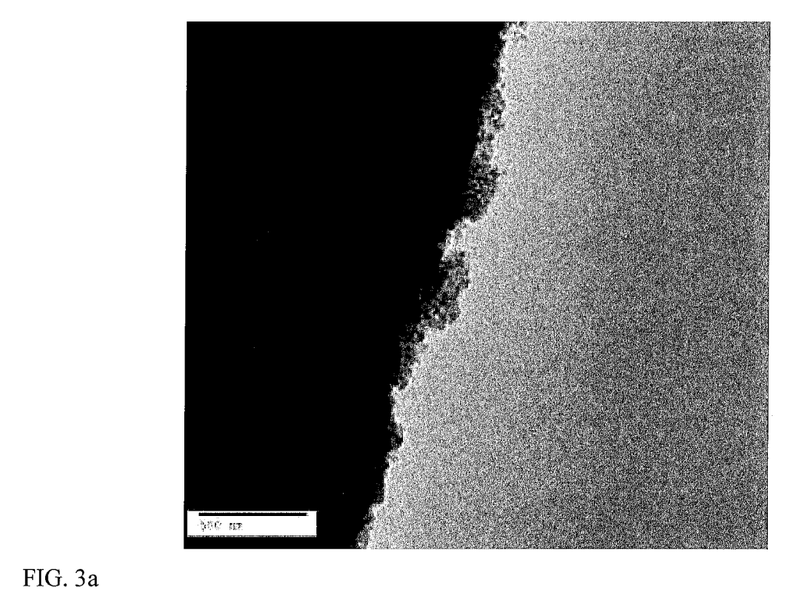
FIG. 3a is a transmission electron microscope (TEM) micrograph showing the surface of a polymer bead of composition B before exposure to soot in a lubricant system.
Figure 3B:
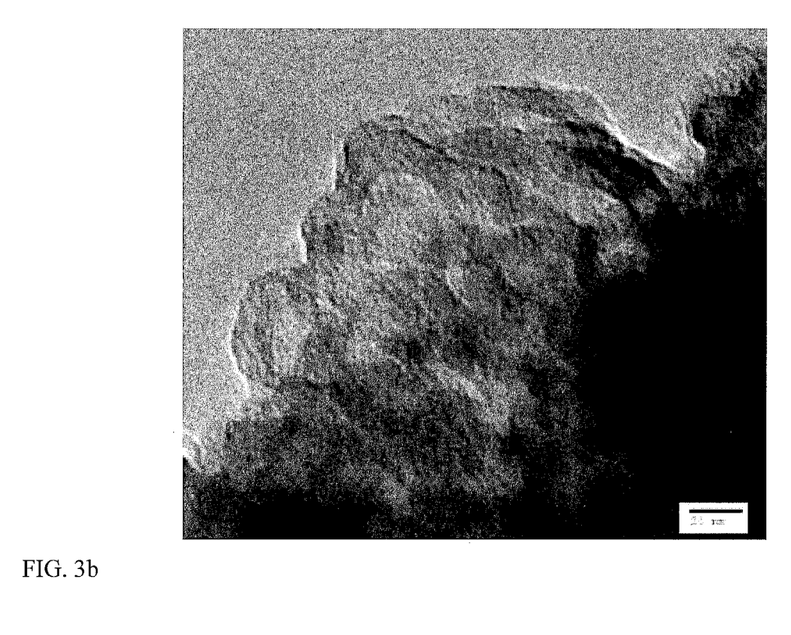
FIG. 3b is a transmission electron microscope (TEM) micrograph showing the surface of a polymer bead of composition B after exposure to soot in a lubricant system.
Figure 4:
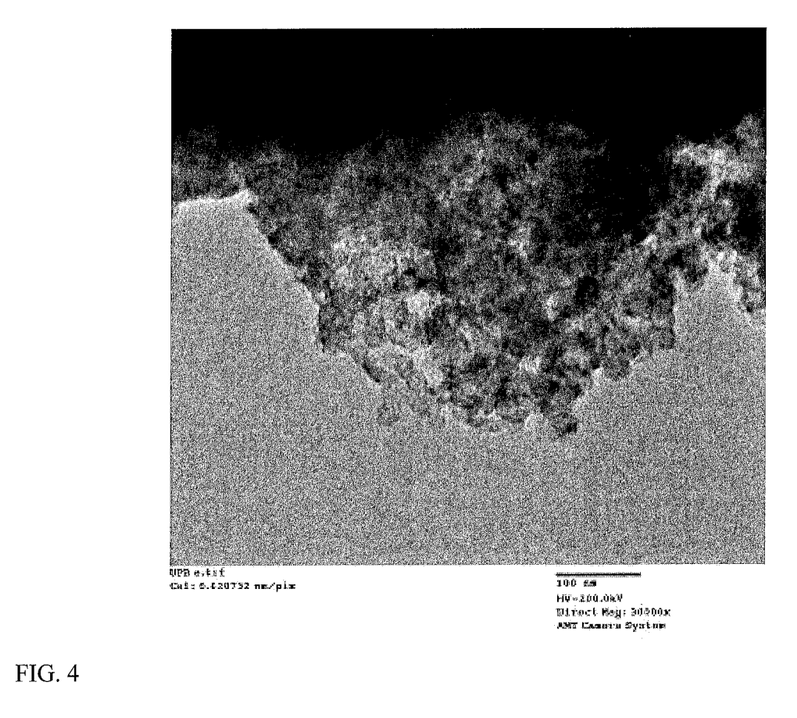
FIG. 4 is a transmission electron microscope (TEM) micrograph showing layers of carbon on the surface of a polymer bead of composition B after exposure to soot in a lubricant system.

In order to determine how the polymer beads sequester soot from the used lubricant a series of TEM (Transmission Electron Microscope) and SEM (Scanning Electron Microscope) images at various magnifications were obtained. Each sample was approximately 100 μm in diameter, and prepared for TEM in a JEOL 2010 transmission electron microscope operating at 200 kV using a folder grid. FIG. 2a is a transmission electron microscope (TEM) micrograph showing the surface of a polymer bead of composition A before exposure to soot in a lubricant system and FIG. 2b is a transmission electron microscope (TEM) micrograph showing the surface of a polymer bead of composition A after exposure to soot in a lubricant system. The surface of the polymer bead in FIG. 2a is relatively smooth, whereas that in FIG. 2b has deposits of a different material on its surface. FIG. 3a is a transmission electron microscope (TEM) micrograph showing the surface of a polymer bead of composition B before exposure to soot in a lubricant system and FIG. 3b is a transmission electron microscope (TEM) micrograph showing the surface of a polymer bead of composition B after exposure to soot in a lubricant system. Again, the surface of the polymer bead FIG. 3a is relatively smooth, and that in FIG. 3b has deposits of a different material on its surface. FIG. 4 is a transmission electron microscope (TEM) micrograph showing the surface of a polymer bead of composition B after exposure to soot in a lubricant system. In this image the magnification of the surface of the polymer bead shows a disordered layer of approximately 400-500 nm in thickness, formed from carbon. No evidence of graphitization was observed. This material was determined to be dis-ordered carbon, indicating that the polymer bead had in fact sequestered soot from a used lubricant and held this soot on its surface.

Figure 5:
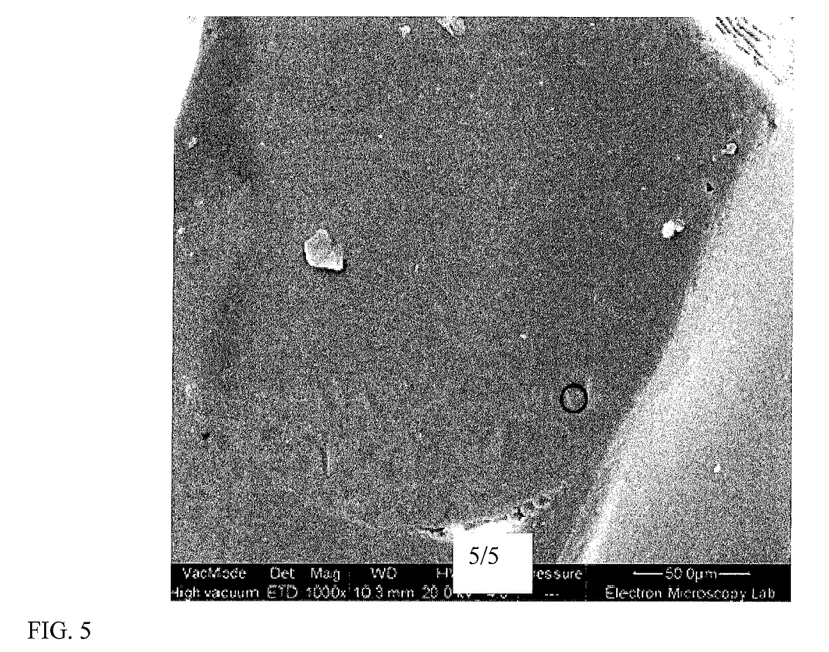
FIG. 5 is a scanning electron microscope (SEM) micrograph showing the surface and a highlighted region on the surface of a polymer bead of composition A before exposure to soot in a lubricant system.
Figure 6:
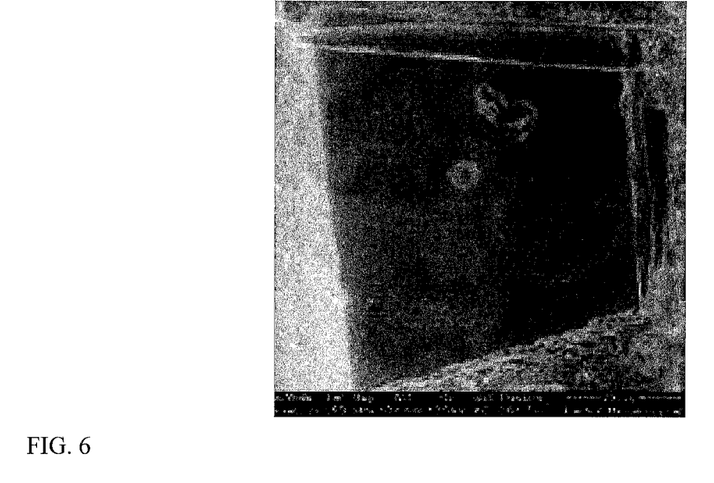
FIG. 6; is a scanning electron microscope (SEM) micrograph showing the surface of a polymer bead of composition B after exposure to soot in a lubricant system.

To understand how the surface layer is distributed across the surface of the polymer beads scanning electron microscopy was used to examine the surface before and after exposure to the used lubricant and soot. FIG. 5 is a scanning electron microscope (SEM) micrograph showing the surface and a highlighted region on the surface of a polymer bead of composition A before exposure to soot in a lubricant system, and FIG. 6 is a scanning electron microscope (SEM) micrograph showing the surface of a polymer bead of composition B after exposure to soot in a lubricant system. The surface of the polymer bead in FIG. 5 is relatively flat and clear of any deposits, whereas that in FIG. 6 shows a series of approximately circular regions of carbon deposits, indicating the presence of soot on the surface of the polymer bead.

Figure 7:
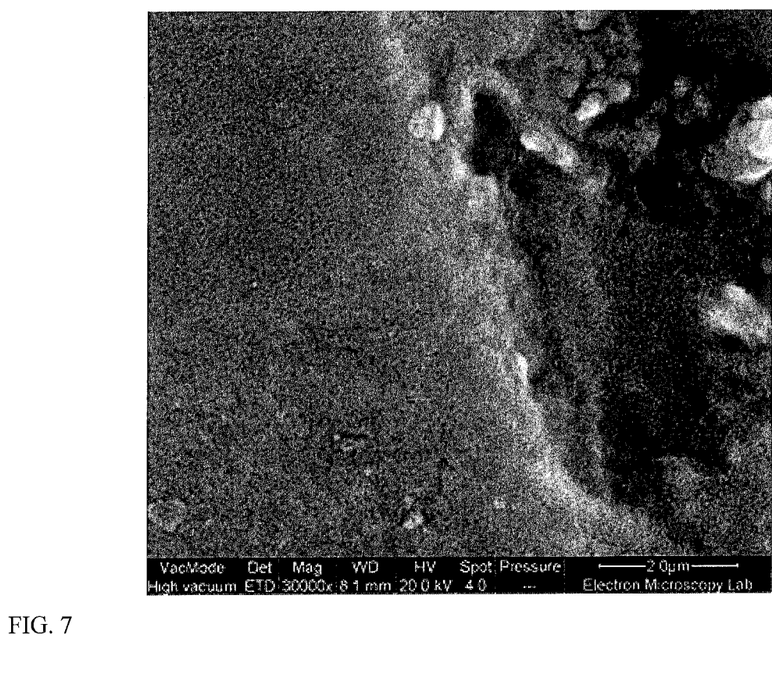
FIG. 7 is a scanning electron microscope (SEM) micrograph of the highlighted area in FIG. 5 showing a magnified portion of the surface of the polymer.

FIG. 7 is a scanning electron microscope (SEM) micrograph showing a magnified portion of the surface of the polymer bead imaged in FIG. 5. One beneficial feature of the polymer beads discussed above is the high specific surface area, which has a positive role in the sequestering of soot from a lubricant. The magnified region shown in FIG. 7 gives some indication of how this arises, in that although the surface of the polymer bead appears flat at a low magnification, on closer inspection the surface is highly textured.

Other preferred embodiments of the invention will be apparent from the appended claims.

The invention claimed is:

1. A method of removing aromatic compounds from a lubricant comprising greater than 50% to about 99.5% by weight base oil, the method comprising contacting the lubricant with a solid-phase polymeric material, the solid-phase polymeric material comprising a hyper cross-linked polymer having a mean pore size of from 0.1 to 100 nm and a specific surface area of from 1000 to 3000 $m^2/g$, the cross-linked polymer comprising aromatic groups.

2. The method of claim 1, wherein the solid-phase polymeric material is obtainable by a polymerization reaction between a monomer comprising a vinyl aromatic group and a cross-linker.

3. The method of claim 1, wherein the aromatic group is selected from a vinyl benzene group, a vinyl pyridine group, a vinyl pyrazine group, a vinyl imidazole group, a vinyl pyrazole group, a vinyl oxazole group, a vinyl thiophene group, a vinyl naphthalene group, a vinyl anthracene group, a vinyl phenanthrene group, a vinyl tetrazole group, a vinyl boron nitride group, and derivatives thereof.

4. The method of claim 1, wherein the cross-linker is selected from divinyl benzene and ethylene glycol-dimethacrylate.

5. The method of claim 1, wherein the solid-phase polymeric material is in the form of polymer beads.

6. The method of claim 5, wherein the polymeric material is in the form of polymer beads having a mean average diameter of from 0.1 to 1500 μm.

7. The method of claim 1, wherein the polymeric material is in the form of a sheet.

8. The method of claim 1, wherein the hyper cross-linked polymer has a mean pore size of from 0.1 to 50 nm.

9. The method of claim 1, wherein the hyper cross-linked polymer has a pore volume of from 0.01 to 5 $cm^3/g$.

10. The method of claim 1, wherein the solid-phase polymeric material further comprises a functional group grafted thereon.

11. The method of claim 10, wherein the method comprises removing the lubricant from a lubricant system, contacting the lubricant with the solid-phase polymeric material, removing the solid-phase polymeric material from the lubricant, and reintroducing the lubricant into the lubricant system.

12. The method of claim 10, wherein the solid-phase polymeric material is present in a lubricant system in the form of a fluidized bed or contained in a sack, the sack being permeable to the lubricant.

13. The method of claim 1, wherein the aromatic compounds are polycyclic aromatic hydrocarbons.

14. A method for preventing the build-up of soot or sludge in a system which comprises a lubricant comprising greater than 50% to about 99.5% by weight base oil, said method comprising contacting a solid-phase polymeric material with the lubricant, the solid-phase polymeric material comprising a hyper cross-linked polymer, the polymer containing aromatic groups, and operating the system.

15. Polymer bead or polymer sheet comprising a solid-phase polymeric material, the solid-phase polymeric material comprising a hyper cross-linked polymer, the cross-linked polymer comprising aromatic groups, wherein, on contacting a lubricant comprising greater than 50% to about 99.5% by weight base oil, the polymer bead removes aromatic compounds from the lubricant.

16. The polymer bead or polymer sheet of claim 15, wherein the aromatic group is selected from a vinyl benzene group, a vinyl pyridine group, a vinyl pyrazine group, a vinyl imidazole group, a vinyl pyrazole group, a vinyl oxazole group, a vinyl thiophene group, a vinyl naphthalene group, a vinyl anthracene group, a vinyl phenanthrene group, a vinyl tetrazole group, a vinyl boron nitride group, and derivatives thereof.

17. The polymer bead or polymer sheet of claim 15, wherein the cross-linker is selected from divinyl benzene and ethylene glycol-dimethacrylate.

18. The polymer bead or polymer sheet of claim 15, wherein the cross-linked polymer is obtainable by introducing cross-links into a polymer which is in a swollen state.

19. A kit comprising a lubricant composition for an internal combustion engine and a solid-phase polymeric material according to claim 15.

20. The method of claim 1, wherein the hyper cross-linked polymer is obtainable by introducing cross-links into a polymer which is in a swollen state.

\* \* \* \* \*